US008957149B2

(12) United States Patent
Zhao et al.

(10) Patent No.: US 8,957,149 B2
(45) Date of Patent: *Feb. 17, 2015

(54) PREPARATION AND USE OF SILICA REINFORCED RUBBER COMPOSITION FOR TRUCK TIRE TREAD

(75) Inventors: Junling Zhao, Hudson, OH (US); Michael Joseph Rachita, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 871 days.

This patent is subject to a terminal disclaimer.

(21) Appl. No.: 12/862,818

(22) Filed: Aug. 25, 2010

(65) Prior Publication Data

US 2012/0053286 A1    Mar. 1, 2012

(51) Int. Cl.
| | |
|---|---|
| *C08L 9/00* | (2006.01) |
| *B60C 1/00* | (2006.01) |
| *C08K 3/36* | (2006.01) |
| *C08L 7/00* | (2006.01) |
| *C08L 15/00* | (2006.01) |
| *C08C 19/06* | (2006.01) |

(52) U.S. Cl.
CPC ............... *B60C 1/0016* (2013.01); *C08K 3/36* (2013.01); *C08L 7/00* (2013.01); *C08L 15/00* (2013.01); *C08C 19/06* (2013.01); *B60C 2200/06* (2013.01)
USPC ........................................................ 524/492

(58) Field of Classification Search
CPC ............. C08L 9/00; C08L 7/00; C08L 15/00; C08L 21/00; C08K 3/36
USPC ................................................. 524/492, 493
See application file for complete search history.

(56) References Cited

U.S. PATENT DOCUMENTS

| | | | | |
|---|---|---|---|---|
| 5,396,940 | A | * | 3/1995 | Segatta et al. ............... 152/209.1 |
| 5,462,979 | A | | 10/1995 | Sandstrom ..................... 523/438 |
| 5,475,051 | A | * | 12/1995 | Machurat ...................... 524/519 |
| 5,488,077 | A | | 1/1996 | Sandstrom ..................... 523/438 |
| 5,504,140 | A | | 4/1996 | Zanzig et al. ................. 524/526 |
| 5,552,490 | A | | 9/1996 | Zanzig et al. ................. 525/237 |
| 5,569,690 | A | | 10/1996 | Terakawa et al. ............. 524/251 |
| 5,714,533 | A | * | 2/1998 | Hatakeyama et al. ........ 524/140 |
| 5,736,593 | A | | 4/1998 | Sandstrom ..................... 523/437 |
| 6,220,323 | B1 | | 4/2001 | Sandstrom et al. ........ 152/209.5 |
| 6,220,326 | B1 | | 4/2001 | Blok et al. ..................... 152/564 |
| 6,482,884 | B1 | | 11/2002 | Schnaal et al. ................ 524/492 |
| 6,593,418 | B2 | | 7/2003 | Herpich et al. ............... 524/588 |
| 6,737,466 | B2 | | 5/2004 | Schnaal et al. ................ 524/492 |
| 6,759,464 | B2 | | 7/2004 | Ajbani et al. ................. 524/445 |
| 6,845,797 | B2 | | 1/2005 | Lin et al. ....................... 152/525 |
| 7,122,586 | B2 | | 10/2006 | Sandstrom et al. ........... 523/344 |
| 7,152,642 | B2 | | 12/2006 | Serra .......................... 152/209.5 |
| 7,371,791 | B2 | | 5/2008 | Hattori et al. ................. 524/274 |
| 7,375,156 | B2 | | 5/2008 | Yagi et al. ..................... 524/492 |
| 7,709,560 | B2 | | 5/2010 | Yagi et al. ..................... 523/438 |
| 2009/0005481 | A1 | * | 1/2009 | Ishida et al. .................. 524/301 |

* cited by examiner

*Primary Examiner* — Ling Choi
*Assistant Examiner* — Lanee Reuther
(74) *Attorney, Agent, or Firm* — Henry C. Young, Jr.

(57) ABSTRACT

The invention relates to preparation and use of a silica reinforced rubber composition. Such rubber composition may be used, for example, for a truck tire tread expected to be exposed to heavy load duty.

Figure 1:
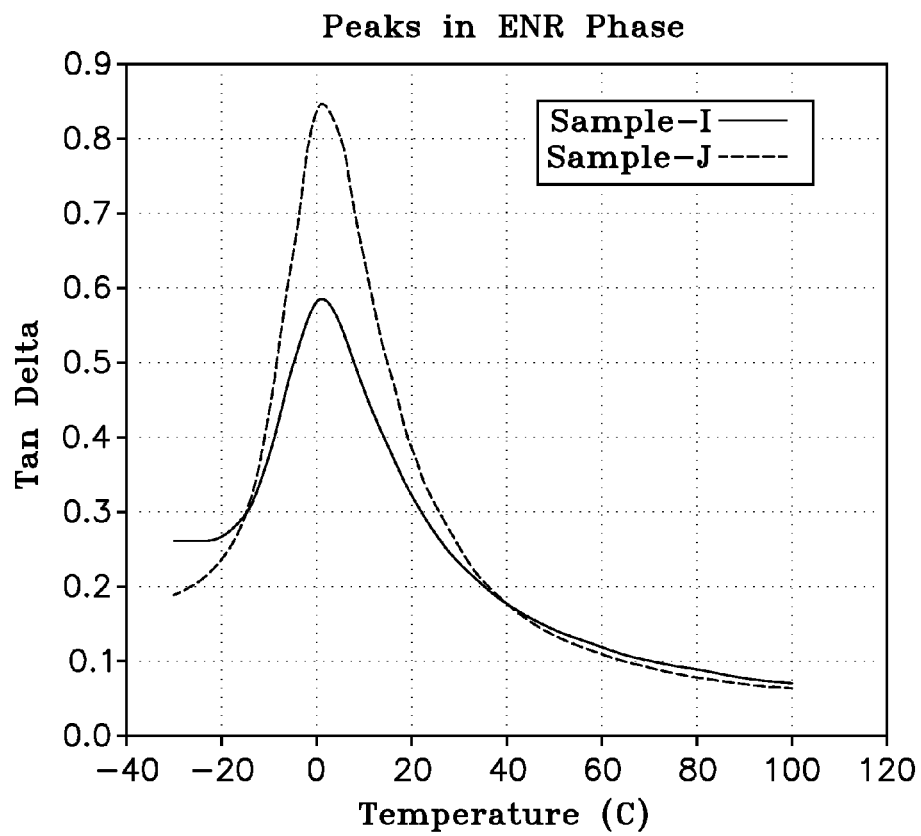

20 Claims, 1 Drawing Sheet

PREPARATION AND USE OF SILICA REINFORCED RUBBER COMPOSITION FOR TRUCK TIRE TREAD

FIELD OF INVENTION

The invention relates to preparation and use of a silica reinforced rubber composition. Such rubber composition may be used, for example, for a truck tire tread expected to be exposed to heavy load duty.

BACKGROUND OF THE INVENTION

Truck tires, for example light and medium duty truck tires, are expected to be able to carry heaver workloads than passenger tires. Their treads are expected to experience greater stresses for their rubber composition and greater internal heat generation and correspondingly greater internal temperature built up as the tire is being worked as well as to experience greater rates of treadwear.

Truck tire treads generally rely upon particulate reinforcing filler in a form of rubber reinforcing carbon black for their rubber reinforcement.

While various advantages have been observed for using particulate reinforcing filler in a form of precipitated silica or a combination of reinforcing carbon black and precipitated silica filler reinforcement, together with a coupling agent for the silica, for passenger tire tread rubber compositions, such combination of reinforcing fillers which include silica are typically not used for truck tires.

Accordingly, a challenge is presented for providing a truck tire tread of a rubber composition which contains both carbon black and precipitated silica reinforcement.

For this invention, epoxidized elastomers are contemplated, namely epoxidized natural rubber (epoxidized natural cis 1,4-polyisoprene rubber), epoxidized polybutadiene rubber and epoxidized styrene/butadiene rubber.

For this invention, an epoxidized natural rubber is evaluated for use as a compatabilizer for compatabilizing amorphous synthetic silica (precipitated silica) with diene-based elastomers comprised of cis 1,4-polyisoprene rubber and cis 1,4-polybutadiene rubber.

Historically, epoxidized natural rubber has been used with various diene-based elastomers in various rubber compositions. For example, see U.S. Pat. Nos. 5,396,940, 5,462,979, 5,475,051, 5,488,077, 5,504,140, 5,552,490, 5,569,690, 5,714,533, 5,736,593, 6,220,323, 6,220,323, 6,220,326, 6,482,884, 6,593,418, 6,737,466, 6,759,464, 6,845,797, 7,122,586, 7,152,642, 7,214,731, 7,371,791, 7,375,156 and 7,709,560.

In the description of this invention, the term "phr," where used, and according to conventional practice, refers to "parts of a respective material per 100 parts by weight of rubber or elastomer".

In the description of this invention, the terms "rubber" and "elastomer," if used herein, may be used interchangeably, unless otherwise prescribed. The terms "rubber composition," "compounded rubber" and "rubber compound," if used herein, are used interchangeably to refer to "rubber which has been blended or mixed with various ingredients and materials" and such terms are well known to those having skill in the rubber mixing or rubber compounding art. The terms "cure" and "vulcanize" may also be used interchangeably unless otherwise noted.

SUMMARY AND DESCRIPTION OF THE INVENTION

In accordance with this invention, method of preparing a silica reinforced rubber composition comprises blending, based upon parts by weight per 100 parts by weight rubber (phr):

(A) conjugated diene-based elastomers comprised of:
  (1) from zero to about 40, alternately about 5 to about 30, phr of cis 1,4-polybutadiene rubber, and
  (2) from about 60 to 100, alternately from about 70 to about 95, phr of additional elastomers comprised of:
    (a) from zero to about 95, alternately from zero to 40, alternately about 55 to about 95, alternately from about 65 to about 90, phr of natural cis 1,4-polyisoprene rubber (NR), and
    (b) from about 5 to 100, alternately from about 60 to 100, alternately from about 5 to about 45, alternately from about 5 to about 30, phr of at least one epoxidized rubber (ER) comprised of epoxidized natural cis 1,4-polyisoprene rubber (ENR), epoxidized polybutadiene rubber and epoxidized styrene/butadiene rubber, preferably epoxidized natural rubber;

(B) from about 20 to about 80, alternately from about 30 to about 70, phr of rubber reinforcing filler as:
  (1) amorphous synthetic silica (precipitated silica) or
  (2) combination of amorphous synthetic silica (precipitated silica) and rubber reinforcing carbon black comprised of greater than 50 weight percent of said precipitated silica; and (C) silica coupler for said precipitated silica having a moiety reactive with hydroxyl groups (e.g. silanol groups) on said precipitated silica and another, different moiety interactive with said cis 1,4-polyisoprene rubber and cis 1,4-polybutadiene rubber; and wherein said epoxidized rubber (ER), particularly epoxidized natural rubber (ENR), has an epoxidation content in a range of from about 5 to about 80, alternately from about 5 to about 25, and alternately from about 30 to about 80, percent.

In one embodiment, said ER is added to the rubber composition subsequent to the addition of both of said precipitated silica and silica coupling agent, except however, where said ER constitutes all, or 100 percent, of the additional elastomers, alternately at least 95 percent and further alternately at least 90 percent, of the additional elastomers, said ER is blended with said precipitated silica and silica coupling agent without said subsequent addition of said ER.

In one embodiment, said conjugated diene-based elastomers are comprised of from zero to about 40 phr of cis 1,4-polybutadiene rubber and from about 60 to 100 phr of additional elastomers comprised of:

(A) from zero to about 95 phr of natural cis 1,4-polyisoprene rubber (NR), and from about 5 to 100 phr of said epoxidized rubber (ER), preferably said natural cis 1,4-polyisoprene rubber (ENR), or (B) from about 55 to about 95 phr of NR and from about 5 to about 45 phr of said ER, particularly said ENR, or (C) from zero to about 40 phr of NR and from about 60 to about 100 phr of said ER, particularly said ENR, or (D) about zero phr of NR and from about 60 to about 100 phr of said ER, particularly said ENR.

In another embodiment said conjugated diene-based elastomers are comprised of from about 5 to about 30 phr of cis 1,4-polybutadiene rubber and from about 70 to about 95 phr of additional elastomers comprised of:

(A) from 55 to about 90 phr of natural cis 1,4-polyisoprene rubber (NR), and from about 5 to 15 phr of said epoxidized rubber (ER), particularly said natural cis 1,4-polyisoprene rubber (ENR), or (B) from about 65 to about 90 phr of NR and from about 5 to about 30 phr of said ER, particularly said ENR, or (C) from zero to about 40 phr of NR and from about 70 to about 95 phr of said ER, particularly said ENR, or (D) about zero phr of NR and from about 70 to about 95 phr of said ER, particularly said ENR.

In one embodiment, where the epoxidation content of said ER, particularly said epoxidized natural rubber (ENR), is 25 percent or less, all of the additional elastomers, particularly the natural cis 1,4-polyisoprene rubber, may be replaced with said expoxidized rubber in which case said ER, particularly said ENR, is preferably added to the rubber composition subsequent to the addition of both of said precipitated silica and silica coupling agent.

Accordingly, in such embodiment, where the epoxidation content of said ER, particularly said epoxidized natural rubber (ENR), is 25 percent or less, particularly in a range of from about 5 to about 25 percent, where the ER, particularly the ENR, replaces the NR, said conjugated diene-based elastomers may be comprised of:

(A) from zero to about 40 phr of cis 1,4-polybutadiene rubber and from about 60 to 100 phr ENR, or (B) from about 5 to about 35 phr of cis 1,4-polybutadiene rubber and from about 65 to about 95 phr of ENR.

In practice, for said epoxidized natural rubber, its epoxide groups are:

(A) contained on the polymer chain of said cis 1,4-polyisoprene rubber;

(B) contained as end group(s) on the polymer chain of said cis 1,4-polyisoporene rubber, or (C) contained on the both the polymer chain and as end group(s) on polymer chain of said cis 1,4-polyisoprene rubber.

A significant aspect of this invention is the procedural delayed addition of the epoxidized elastomer (ER), particularly the expoxidized natural rubber (ENR), to the rubber composition subsequent to the addition of both of the precipitated silica and the coupling agent, unless the ER constitutes at least about 90, alternately at least about 95, weight percent of the additional elastomers, for which it is not appropriate for such delayed introduction of the ER.

This is considered herein to be significant in a sense that such delayed addition of the epoxidized natural rubber is envisioned as both improving the dispersion of the silica within the rubber composition and enabling a more complete interaction of the precipitated silica and coupling agent prior to interaction with the epoxidized natural rubber with a resultant greater silica reinforcement of the associated elastomers in the rubber composition.

Apparently, then, the expoxidized natural rubber in some way interacts disadvantageously with the precipitated silica and/or its coupling agent to prevent, or retard, the ultimate precipitated silica-coupling agent-rubber-reinforcing effect.

A significant embodiment of this invention is intended to prevent, or retard, such interfering interaction while promoting a better, or improved, dispersion of the silica within the rubber composition and, also enhancing physical properties of the rubber composition.

Accordingly, and in additional accordance with this invention, a rubber composition prepared by such method is provided.

In further accordance with this invention, a tire is provided having a component comprised of said rubber composition.

In further accordance with this invention, said method (of rubber composition preparation) further comprises said method of preparation of said rubber composition followed by building said rubber composition as a component into an assembly of tire components to form a tire.

In further accordance with this invention, a tire prepared by said method is provided.

The rubber composition of the present invention may contain conventional amounts of known rubber chemicals. Typical amounts of tackifier resins, if used, may comprise about 0.5 to about 10 phr, usually about 1 to about 5 phr. Typical amounts of plasticizers comprise about 1 to about 50 phr. Such plasticizers can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr. Typical amounts of fatty acids, if used, which are usually comprised primarily of stearic acid, comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization of the rubber composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.5 to about 2.5 being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 0.5 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of most of the above additives are not considered to be an aspect of the present invention, unless otherwise observed.

The rubber composition may be and is preferably prepared by mixing the diene-based rubber, carbon blacks and other rubber compounding ingredients, exclusive of the rubber curatives, in at least one sequential mixing step with at least one mechanical mixer, usually referred to as "non-productive" mix stage(s), to a temperature in a range of about 150° C. to about 180° C. for one to about 4 minutes, so long as the aforesaid delayed addition of the epoxidized natural rubber is accomplished, followed by a final mix stage in which the curatives, such as sulfur and accelerators, are added and mixed therewith for about 1 to about 4 minutes to a temperature within a range of about 90° C. to about 125° C. The terms "non-productive" and "productive" mix stages are well known to those having skill in the rubber mixing art.

It is to be appreciated that the rubber composition is conventionally cooled to a temperature below about 40° C. between the aforesaid mix stages.

It is to be further appreciated that the aforesaid duration of time for the required temperature maintenance for the mixing process(es) during the non-productive mix stages can be accomplished, for example, by (A) adjusting the motor speed of the mixer, namely reducing the motor speed after the desired temperature of the rubber composition is reached, in a variable speed mixer or by (B) utilizing two or more mix stages sufficient to satisfy the duration requirement for the aforesaid maximum mixing temperature maintenance.

Vulcanization of the rubber composition of the present invention is generally carried out at conventional temperatures ranging from 100° C. to 200° C. Preferably, the vulcanization is conducted at temperatures ranging from 110° C. to 180° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a tread for a pneumatic tire which is the subject of this invention. Such tires can be built, shaped, molded and cured by various methods which are known and will be readily apparent to those having skill in such art. As can be appreciated, the tire may be a passenger tire, aircraft tire, truck tire and the like. Preferably, the tire is a passenger tire. The tire may also be radial or bias, with a radial tire being preferred.

The invention may be better understood by reference to the following examples in which the parts and percentages are by weight unless otherwise indicated.

EXAMPLE I

In this example, natural rubber-rich rubber compositions were prepared which contained particulate filler reinforcement.

Rubber Sample A is a Control rubber sample which contained all rubber reinforcing carbon black as the rubber reinforcing filler.

Rubber Samples B through G contained all precipitated silica reinforcement, accompanied by silica reinforcing agent, together with only a very small amount of rubber reinforcing carbon black to provide a black color to the rubber compositions.

In particular, rubber Sample B is also represented as a Control rubber sample because it contains virtually all precipitated silica reinforcement but without addition of epoxidized natural rubber.

Rubber Sample C is an Experimental rubber Sample in which epoxidized natural rubber (EN) was added to the rubber composition with the precipitated silica reinforcement to compare to silica-containing Control rubber Sample B without the epoxidized rubber addition as well to Control rubber sample with its carbon black reinforcement.

Experimental rubber Samples D and E, containing the silica reinforcement, also contained the epoxidized natural rubber as well as an addition of cis 1,4-polybutadiene rubber.

The compositions were prepared by mixing the ingredients in several stages, namely, one non-productive (NP) stage (without the curatives) followed by a productive (P) mix stage (for adding the sulfur curatives), then the resulting composition was cured under conditions of elevated pressure and temperature.

For the non-productive mixing stage, the ingredients, including the elastomers and particulate reinforcing filler, are mixed for about four minutes to a temperature of about 160° C. In a final productive mixing stage the curatives are mixed with the rubber composition (mixture) in a Banbury type mixer; namely, the accelerator(s) and sulfur to a maximum temperature of about 110° C. for about three minutes. The rubber compositions were vulcanized at a temperature of about 150° C. for about 18 minutes.

The following Table 1 summarizes ingredients used for the rubber Samples A through E for Example I and rubber Samples G through J for Example II.

TABLE 1

| Materials (phr) | Parts |
| --- | --- |
| Non-Productive Mixing (NP) | |
| Natural rubber[1] | 40 to 100 |
| Cis 1,4-polybutadiene rubber A[2] | 0 and 5 |
| Cis 1,4-polybutadiene rubber B[3] | 0 and 30 |
| Styrene/butadiene rubber (SBR)[4] | 0 or 7 |
| Carbon black A[5] | 0 and 49 |
| Carbon black B[6] | 0 to 3.2 |
| Zinc oxide | 3 |
| Fatty acid[7] | 2 |
| Precipitated silica[8] | 0 to 50 |
| Coupling agent[9] | 0 to 4.8 |
| Epoxidized natural rubber (ENR)[10] | 0 to 30 |
| Rubber processing oil | 0 to 5 |
| Productive Mixing (P) | |
| Sulfur | 1 to 1.7 |
| Accelerator(s)[11] | 1.5 |

[1]Natural cis 1,4-polyisoprene rubber as TTR20
[2]High cis 1,4-polybutadiene rubber as BUD1207 ™ from The Goodyear Tire & Rubber Company
[3]High cis 1,4-polybutadiene rubber as CB25 ™ from Lanxess
[4]Styrene/butadiene rubber (SBR) as PLF1502 ™ from The Goodyear Tire & Rubber Company
[5]N205, an ASTM designation
[6]N330, an ASTM designation
[7]Comprised of stearic acid, palmitic acid and oleic acid
[8]Precipitated silica as Zeosil 1165MP ™ from Rhodia
[9]Coupling agent, liquid, as Si266 ™ from Degussa Evonic, comprised of a bis-3(triethioxysilylpropyl) polysulfide having an average in a range of from about 2.1 to about 2.6 connecting sulfur atoms in its polysulfidic bridge and reported in the Table as the coupling agent
[10]Epoxidized natural rubber (referred to herein as "ENR") as ENR 50 ™ (50 percent epoxidized level) from the Malaysian rubber company.
[11]Sulfenamide and diphenyl guanidine sulfur vulcanization accelerators Various physical properties for the rubber compositions are summarized in the following Table 2 with the parts and percentages being by weight unless otherwise indicated.

The various tests are considered herein to be well known to those having skill in the rubber composition analytical and evaluation art.

TABLE 2

| | Samples | | | | |
|---|---|---|---|---|---|
| | Control A | Control B | C | D | E |
| Materials (phr) | | | | | |
| Natural rubber | 88 | 100 | 70 | 40 | 40 |
| Polybutadiene rubber A | 5 | 0 | 0 | 0 | 0 |
| Polybutadiene rubber B | 0 | 0 | 0 | 30 | 30 |
| SBR rubber | 7 | 0 | 0 | 0 | 0 |
| Epoxidized natural rubber (ENR) | 0 | 0 | 30 | 30 | 30 |
| Carbon black A | 49 | 0 | 0 | 0 | 0 |
| Carbon black B (small amount added for color) | 0 | 3.2 | 3.2 | 3.2 | 3.2 |
| Precipitated silica | 0 | 40 | 40 | 40 | 50 |
| Coupling agent | 0 | 3.2 | 3.2 | 3.2 | 3.2 |
| Rubber processing oil | 1 | 0 | 0 | 0 | 5 |
| Properties | | | | | |
| Grosch Abrasion rate[1] (compared to Control A value which is normalized to a value of 100) (Higher values indicate greater resistance to abrasion) | | | | | |
| High severity (70N), 12° slip angle, disk speed = 20 km/hr, distance = 250 meters | 100 | 48 | 96 | 177 | 177 |
| Ultra high severity (70N), 16° slip angle, disk speed = 20 km/hr, distance = 500 meters | 100 | 73 | 61 | 169 | 177 |
| Abrasion rate at constant side force (compared to Control A value which is normalized to 100) (Higher values indicate greater resistance to abrasion) | | | | | |
| At 30 Newtons force | 100 | 18 | 75 | 191 | 211 |
| At 40 Newtons force | 100 | 15 | 74 | 223 | 258 |
| At 50 Newtons force | 100 | 13 | 73 | 252 | 302 |
| At 60 Newtons force | 100 | 11 | 72 | 278 | 344 |
| Calculated Rubber Composition (Compound) glass transition temperature (Tg) | | | | | |
| Calculated Tg (° C.) | −66.7 | −65.0 | −51.5 | −64.7 | −65.6 |
| ATS[2] | | | | | |
| 100% ring modulus (MPa) | 2.1 | 1.4 | 2.1 | 2.2 | 2.5 |
| 300% ring modulus (MPa) | 12 | 7.3 | 9.4 | 9.8 | 9.8 |
| Tensile strength (MPa) | 24.1 | 22.6 | 13.6 | 19.5 | 17.1 |
| Elongation at break (%) | 529 | 612 | 424 | 530 | 506 |
| Rebound (higher value is better - indicating less tendency for internal heat buildup and predictive of less rolling resistance for a truck tire tread of such rubber composition) | | | | | |
| Zwick at 100° C. | 58 | 71 | 62 | 67 | 61 |
| RPA[3] | | | | | |
| Uncured (Frequency 0.833 Hz) G' (15% strain), 100° C., (MPa) | 0.155 | 0.147 | 0.203 | 0.294 | 0.353 |
| Cured (Frequency 1.0 Hz) G' (10% strain), 100° C., (MPa) | 1.24 | 0.94 | 1.01 | 1.34 | 1.51 |
| Tan delta, 100° C., (10% strain), 1 Hz | 0.14 | 0.06 | 0.08 | 0.07 | 0.10 |
| Tan delta, 40° C., (10% strain), 1 Hz | 0.20 | 0.10 | 0.17 | 0.15 | 0.2 |

[1] The Grosch abrasion rate determination run on an LAT-100 Abrader and measured in terms of mg/km of rubber abraded away. The test rubber sample is placed at a slip angle under constant load (Newtons) as it traverses a given distance on a rotating abrasive disk (disk from HB Schleifmittel GmbH). In practice, a low abrasion severity test may be run, for example, at a load of 20 Newtons at a slip angle of 2 degrees and a disk speed of 40 kmh (kilometers per hour) at a sample travel of 7,500 meters. A medium severity test may be run, for example at a load of 40 Newtons at a slip angle of 6 degrees and a disk speed of 20 km/hr and a sample travel distance of 1,000 meters. A high severity test may be run, for example at a load of 70 Newtons at a slip angle of 12 degrees and a disk speed of 20 km/hr and a sample travel distance of 250 meters. A medium severity test may be run, for example at a load of 70 Newtons at a slip angle of 16 degrees and a disk speed of 20 km/hr and a sample travel distance of 500 meters. For Table 3, as well as for Table 4, the Grosch abrasion values are normalized to a value of 100 for the Control rubber Sample.
[2] Automated Testing System (ATS) instrument.
[3] Rubber Process Analyzer (RPA)

From Table 2, the following observations are presented:

(A) For carbon black reinforced Control rubber Sample A, its Grosch Abrasion Properties are normalized to values of 100 for comparative purposes.

(B) For silica reinforced rubber Control rubber Sample B, its Grosch Abrasion Properties are significantly lower than such Properties for the carbon black reinforced Control rubber Sample A thereby indicating the silica reinforced rubber composition B to have significantly lower resistance to abrasion than the carbon black reinforced rubber composition A.

(C) For silica reinforced rubber Control rubber Sample C with addition of epoxidized rubber (ENR), it was considered herein to be a significant discovery that its Grosch Abrasion Properties become significantly and beneficially higher than the resistance to abrasion properties of Control silica reinforced rubber Control rubber Composition B without the ENR addition. However, its resistance to abrasion properties were still significantly less than those of carbon black reinforced Control rubber Sample A.

(D) For silica reinforced rubber Experimental rubber Sample D with addition of both epoxidized rubber (ENR) and Cis 1,4-polybutadiene rubber, it was considered herein to be a significant discovery that its Grosch Abrasion Properties are significantly and beneficially higher by a great magnitude than those of both carbon black reinforced rubber Composition A as well as silica reinforced rubber compositions B and C (with the ENR addition). This indicates that the silica reinforced rubber composition D with both the ENR and polybutadiene rubber addition has a significantly and beneficially greater resistance to abrasion than all of rubber compositions A, B and C.

(E) For silica reinforced Experimental rubber Sample E with an increased silica content and addition of both epoxidized rubber (ENR) and Cis 1,4-polybutadiene rubber, increasing the silica content for rubber Sample E further beneficially increased its Grosch Abrasion resistance properties.

From this Example I, it is concluded that addition of both the ENR and cis 1,4-polybutadiene rubber to the silica reinforced basic rubber composition beneficially increased its abrasion resistance to a level comparable to the carbon black reinforced rubber composition of Control rubber Sample A.

EXAMPLE II

Additional experiments were conducted in order to evaluate the contribution of the epoxidized natural rubber (ENR) to achieve a significant abrasion resistance increase for the silica reinforcement-containing rubber composition.

For this Example II, silica reinforced Comparative rubber Composition G and silica reinforced Experimental rubber Compositions H, I and J were prepared.

All of the rubber compositions contained a combination of natural rubber and cis 1,4-polybutadiene rubber elastomers. Experimental rubber Compositions H and I also contained additions of 15 phr and 30 phr of ENR, respectively.

Experimental rubber Composition J also contained an addition of 30 phr of the ENR.

However, for rubber Composition J the addition of the ENR was delayed until after the addition of precipitated silica and silica coupling agent. In this manner, it is considered that ENR can interact with the product of the precipitated silica and its coupling agent instead of primarily interacting directly with the precipitated silica.

It is envisioned that allowing the ENR to interact directly with the precipitated silica for Experimental rubber Samples H and I may tend to isolate the precipitated silica and prevent it from more effectively combining with its coupling agent.

The rubber compositions (Samples) were prepared in the manner reported in Example I.

Various physical properties for the rubber compositions are summarized in the following Table 3 with the parts and percentages being by weight unless otherwise indicated.

TABLE 3

|  | Samples (phr) | | | Delayed ENR Addition |
| --- | --- | --- | --- | --- |
|  | Control G | H | I | J |
| Natural rubber | 70 | 55 | 40 | 40 |
| Cis 1,4-polybutadiene rubber B | 30 | 30 | 30 | 30 |
| Epoxidixed natural rubber (ENR) | 0 | 15 | 30 | 30 |
| Carbon black B | 3 | 3 | 3 | 3 |
| Precipitated silica | 40 | 40 | 40 | 40 |
| Silica coupling agent | 4.8 | 4.8 | 4.8 | 4.8 |
| Properties | | | | |
| Grosch Abrasion rate[1] (compared to rubber G value which is normalized to a value of 100) (Higher values indicate greater resistance to abrasion) | | | | |
| High severity (70N), 12° slip angle, disk speed = 20 km/hr, distance = 250 meters | 100 | 126 | 145 | 208 |
| Ultra high severity (70N), 16° slip angle, disk speed = 20 km/hr, distance = 500 meters | 100 | 119 | 132 | 175 |
| Abrasion rate at constant side force (compared to rubber G value which is normalized to 100), (Higher values indicate greater resistance to abrasion) | | | | |
| At 30 Newtons force | 100 | 160 | 144 | 211 |
| At 40 Newtons force | 100 | 161 | 166 | 230 |
| At 50 Newtons force | 100 | 162 | 185 | 246 |
| At 60 Newtons force | 100 | 163 | 203 | 260 |
| Calculated rubber composition (compound) glass transition temperature (Tg) | | | | |
| Calculated Tg (° C.) | −78.2 | −71.5 | −64.7 | −64.7 |
| ATS[2] | | | | |
| 100% ring modulus (MPa) | 2 | 2.3 | 2.5 | 2.4 |
| 300% ring modulus (MPa) | 9 | 9.6 | 11 | 10.5 |
| Tensile strength (MPa) | 24 | 23 | 20 | 23 |
| Elongation at break (%) | 610 | 571 | 502 | 575 |
| Rebound (higher value is better - indicating less tendency for internal heat buildup and predictive of less rolling resistance for a truck tire tread of such rubber composition) | | | | |
| Zwick at 100° C. | 74 | 71 | 71 | 72 |

TABLE 3-continued

|  | Samples (phr) | | | Delayed ENR Addition |
|---|---|---|---|---|
|  | Control G | H | I | J |
| RPA³ | | | | |
| Uncured, (frequency 0.833 Hz) G' (15% strain), 100° C., (MPa) | 0.169 | 0.255 | 0.295 | 0.204 |
| Cured (frequency 1 Hz) G' (10% strain), 100° C. (MPa) | 1.39 | 1.39 | 1.35 | 1.29 |
| Tan delta (0° C.), 3% strain, 10 Hz | — | — | 0.58 | 0.84 |
| Tan delta (60° C.), 3% strain, 10 Hz | — | — | 0.12 | 0.11 |
| Tan delta (100° C.), 3% strain, 10 Hz | — | — | 0.07 | 0.06 |
| Tan delta (100° C.), 10% strain, 1 Hz | 0.05 | 0.06 | 0.06 | 0.05 |
| Tan delta (40° C.), 10% strain, 1 Hz | 0.101 | 0.140 | 0.145 | 0.124 |
| Degree of dispersion⁴ (%) | 95 | N/A | 67 | 99 |

[4] Degree of dispersion of the reinforcing filler in the rubber composition as determined by a Dispergrader 1000 analytical instrument.

From Table 3, the following observations are presented:

(A) For silica reinforced Control rubber Sample G:
(1) Its Grosch Abrasion Properties are normalized to values of 100 for comparative purposes,
(2) Its calculated glass transition temperature (Tg) was about −78° C.,
(3) Its uncured Rebound (100° C.) value was 74,
(4) Its Tan delta values (100° C. and 40° C.) were 0.05 and 0.10, respectively.

(B) For silica reinforced rubber Control rubber Samples H and I with 15 phr and 30 phr of ENR, respectively, their Grosch Abrasion Properties are significantly higher than such Properties for the Control rubber Sample G without the ENR addition, thereby indicating the silica reinforced rubber compositions H and I with the ENR addition contributed to a significantly higher resistances to abrasion.

(C) For silica reinforced rubber Sample J with delayed 30 phr ENR addition, its Grosch Abrasion Properties are significantly greater than all of rubber Compositions G (without ENR addition), rubber Composition H (with its non-delayed 5 phr ENR addition) and rubber Composition I (with its non-delayed 30 phr ENR addition) indicating a significant and beneficially greater resistance to abrasion contributed by the delayed addition of the ENR until after the addition of both the precipitated silica and coupling agent for the rubber composition.

(D) The degree of dispersion of the silica reinforcement in the rubber composition increased dramatically to a value of 99 percent for Rubber Sample J (with the delayed addition of the ENR) as compared to a value of 67 for rubber Sample I (with its non-delayed ENR addition) and compared favorably with the value of 95 percent dispersion for rubber Sample G (without ENR addition).

BRIEF DESCRIPTION OF ACCOMPANYING DRAWING

A Drawing is presented to provide a further understanding of the invention.

The Drawing is a graphical representation of low strain tan delta (y axis) versus temperature (x axis) representing a curve generated for rubber Sample I (solid line) and a curve generated for rubber Sample J (dotted line) of this Example for the tan delta peaks in the ENR phase of the rubber composition, remembering that the rubber composition contains dual phases of rubber, one of which phases is the ENR phase.

The Drawing

In the Drawing (FIG. 1), it is seen that:

(A) for rubber Sample I with the ENR being added with the precipitated silica and coupling agent, a solid Tan delta curve is presented, and (B) for rubber Sample J with the delayed addition of the ENR until after the addition of the precipitated silica and coupling agent, a dashed Tan delta curve is presented.

It is observed from the Drawing that:

(A). For low strain tan delta values at 0° C., (at low 3% strain and 10 Hz), the tan delta curves for both rubber Sample I and rubber Sample J maximized at a value of 0.58 for Sample I and significantly higher at a value of 0.84 for Sample J which is indicative of both rubber compositions being suitable for promoting wet traction for a tire having a tread of such rubber composition.

(B) For low strain tan delta values at 60° C., (at low 3% strain and 10 Hz), the tan delta curves for both rubber Sample I and rubber Sample J were substantially the same with a value of 0.12 for Sample I and a value of 0.11 for Sample J which is indicative of both rubber compositions being suitable for promoting reduced rolling resistance for a tire having a tread of such rubber composition, with a corresponding promotion of increased fuel efficiency for an associated vehicle.

(C) For low strain Tan delta values at 100° C., (at low 3% strain and 10 Hz), the tan delta curves for both rubber Sample I and rubber Sample J were substantially the same with a value of 0.07 for Sample I and a value of 0.06 for Sample J which is indicative of both rubber compositions being suitable for promoting reduced rolling resistance for a tire having a tread of such rubber composition, with a corresponding promotion of increased fuel efficiency for an associated vehicle.

It is concluded that this Example demonstrates that abrasion resistance and indicative wet traction performance can be achieved without significantly sacrificing indicative rolling resistance for a tire with a tread of the compositions evaluated.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a silica reinforced rubber composition which comprises blending, based upon parts by weight per 100 parts by weight rubber (phr):
   (A) conjugated diene-based elastomers comprised of:
      (1) from zero to about 40 phr of cis 1,4-polybutadiene rubber, and
      (2) from about 60 to 100 phr of additional elastomers comprised of:
         (a) from zero to about 95 phr of natural cis 1,4-polyisoprene rubber (NR), and
         (b) from about 5 to 100 phr of epoxidized natural cis 1,4-polyisoprene rubber (ENR),
   (B) from about 20 to about 80 phr of rubber reinforcing filler as:
      (1) amorphous synthetic silica comprised of precipitated silica or
      (2) combination of said precipitated silica and rubber reinforcing carbon black comprised of greater than 50 weight percent of said precipitated silica; and
   (C) silica coupler for said precipitated silica having a moiety reactive with hydroxyl groups on said precipitated silica and another, different moiety interactive with said cis 1,4-polyisoprene rubber and cis 1,4-polybutadiene rubber;
   wherein said epoxidized natural rubber (ENR), has an epoxidation content in a range of from about 5 to about 25 percent;
   wherein said ENR is added to the rubber composition subsequent to the addition of both of said precipitated silica and silica coupling agent; and
   wherein the silica coupler is comprised of a bis(3-triethoxysilylpropyl) polysulfide having an average of from about 2.1 to about 2.6 connecting sulfur atoms in its polysulfidic bridge.

2. The method of claim 1 wherein said conjugated diene-based elastomers are comprised of from about 5 to about 30 phr of cis 1,4-polybutadiene rubber and from about 70 to about 95 phr of additional elastomers comprised of:
   (A) from 55 to about 90 phr of natural cis 1,4-polyisoprene rubber (NR), and from about 5 to 15 phr of said epoxidized natural rubber (ENR), or
   (B) from about 65 to about 90 phr of NR and from about 5 to about 30 phr of said ENR, or
   (C) from zero to about 40 phr of NR and from about 70 to about 95 phr of said ENR, or
   (D) about zero phr of NR and from about 70 to about 95 phr of said ENR.

3. A rubber composition prepared by the method of claim 2.

4. A tire having a component comprised of the rubber composition of claim 3.

5. The method of claim 2 wherein said additional elastomers are comprised of from about 55 to about 90 phr of natural cis 1,4-polyisoprene rubber (NR) and from about 5 to 15 phr of said epoxidized natural rubber (ENR).

6. A rubber composition prepared by the method of claim 5.

7. A tire having a component comprised of the rubber composition of claim 6.

8. The method of claim 5 wherein, for said epoxidized natural rubber, its epoxide groups are:
   (A) contained on the polymer chain of said cis 1,4-polyisoprene rubber;
   (B) contained as end group(s) on the polymer chain of said cis 1,4-polyisoporene rubber, or
   (C) contained on both the polymer chain and as end group(s) on polymer chain of said cis 1,4-polyisoprene rubber.

9. The method of claim 2 wherein said additional elastomers are comprised of about zero phr of NR and from about 70 to about 95 phr of said ENR.

10. A rubber composition prepared by the method of claim 9.

11. A tire having a component comprised of the rubber composition of claim 10.

12. The method of claim 9 wherein, for said epoxidized natural rubber, its epoxide groups are:
    (A) contained on the polymer chain of said cis 1,4-polyisoprene rubber;
    (B) contained as end group(s) on the polymer chain of said cis 1,4-polyisoporene rubber, or
    (C) contained on both the polymer chain and as end group(s) on polymer chain of said cis 1,4-polyisoprene rubber.

13. The method of claim 2 wherein the epoxide groups of said epoxidized natural rubber are contained:
    (A) on the polymer chain of said cis 1,4-polyisoprene rubber;
    (B) as end group(s) on the polymer chain of said cis 1,4-polyisoporene rubber, or
    (C) on both the polymer chain and as end group(s) on polymer chain of said cis 1,4-polyisoprene rubber.

14. The method of claim 1 wherein, for said epoxidized natural rubber, its epoxide groups are:
    (A) contained on the polymer chain of said cis 1,4-polyisoprene rubber;
    (B) contained as end group(s) on the polymer chain of said cis 1,4-polyisoporene rubber, or
    (C) contained on the both the polymer chain and as end group(s) on polymer chain of said cis 1,4-polyisoprene rubber.

15. A rubber composition prepared by the method of claim 14.

16. A tire having a component comprised of the rubber composition of claim 15.

17. A rubber composition prepared by the method of claim 1.

18. A tire having a component comprised of the rubber composition of claim 17.

19. A tire having a component comprised of the rubber composition of claim 18.

20. The tire of claim 18 wherein said tire component is a tire tread.

* * * * *